United States Patent [19]
Horaguchi

[11] 3,772,461
[45] Nov. 13, 1973

[54] COLOUR KILLER SYSTEM FOR COLOUR TELEVISION RECEIVER

[75] Inventor: Akira Horaguchi, Kawasaki, Japan

[73] Assignee: The General Corporation, Kawasaki-shi, Japan

[22] Filed: Feb. 7, 1972

[21] Appl. No.: 224,132

[30] Foreign Application Priority Data

Feb. 13, 1971 Japan .................................. 46/6269

[52] U.S. Cl. ......................... 178/5.4 CK, 178/5.4 P
[51] Int. Cl. ............................................. H04n 9/48
[58] Field of Search .................... 178/5.4 R, 5.4 CK, 178/5.4 AC, 5.4 SY, 5.4 P

[56] References Cited

UNITED STATES PATENTS

| | | | |
|---|---|---|---|
| 2,955,154 | 10/1960 | Macovski | 178/5.4 CK |
| 2,961,484 | 11/1960 | Macovski | 178/5.4 CK |
| 3,406,249 | 10/1968 | Spies | 178/5.4 CK |
| 3,492,417 | 1/1970 | Scholz | 178/5.4 P |

*Primary Examiner*—Robert L. Richardson
*Attorney*—Ernest A. Greenside

[57] ABSTRACT

A colour killer system in a colour television receiver is used with a signal transmission system such as PAL system in which a pair of colour signals effect simultaneous quadrature balanced modulation of a colour subcarrier with respect to a pair of mutually perpendicular modulation axes, with one of the axes being reversed 180° for alternate horizontal scanning lines. The resulting colour television signal contains a colour burst capable of providing distinction of the polarity of the colour subcarrier that is reversed. Said colour killer system uses a subcarrier having an offset frequency of $$fsc \pm [2n - 1)2]fH$$

where fsc denotes the frequency of a colour subcarrier, fH a line frequency and n an integer is used to derive a colour killer signal.

8 Claims, 8 Drawing Figures

COLOUR KILLER SYSTEM FOR COLOUR TELEVISION RECEIVER

Figure 1:
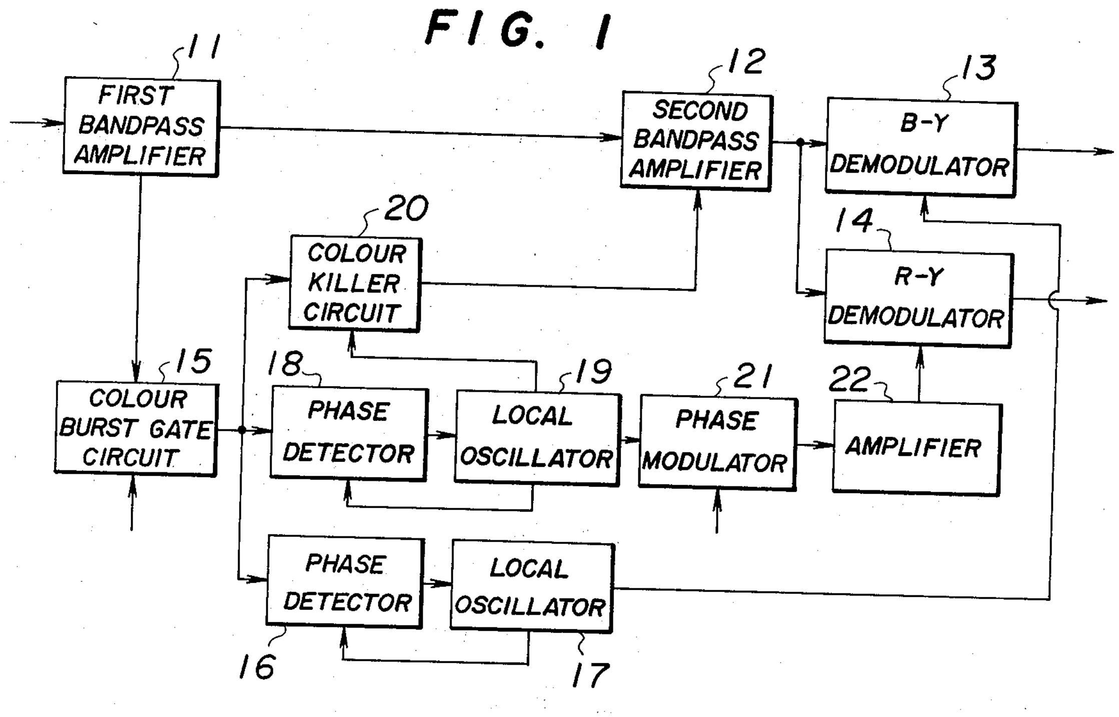

The invention relates to a colour killer system in a colour television receiver incorporating a signal transmission system such as PAL system.

The reception of a black-and-white television signal by a colour television receiver may cause unpleasant colour noises to appear on the screen as a result of operation of the associated colour signal circuitry, and thus in order to avoid this and provide satisfactory reproduction of a black-and-white image, it is desirable to make the bandpass amplifier inoperative upon receiving a black-and-white television signal. The same applies when receiving a colour television signal according to a different transmission system. The desired result is accomplished by utilizing the absence of a colour burst in a black-and-white television signal or a different signal of the colour burst in a colour television signal according to a different transmission system. Thus the presence or absence of a given colour burst may be detected to derive a change in voltage, which change can be used to control the bandpass amplifier by turning it on or off. As is known, such a change in voltage is produced by a colour killer circuit including a phase detector which is operable to derive a distinct voltage only in response to a given phase relationship between the colour burst and a local subcarrier.

For a colour television signal according to PAL system, the colour burst alternates in phase between +45° and −45° for successive horizontal scanning lines, and consequently the associated colour killer circuit requires the supply of a subcarrier which underoges a phase alternation of 180° for successive line periods. This subcarrier has been obtained in the conventional colour television receivers according to PAL system from a circuitry including a switch which controls the phase alternation, and is used normally for demodulation of R-Y colour difference component. Such a receiver, therefore, suffers from a disadvantage that an unstable component such as a switch is likely to make the operation of the colour killer circuit unstable.

It is an object of the invention to provide a colour killer system in a colour television receiver which is improved in that in deriving a change in voltage from the presence or absence of a given colour burst for turning the bandpass amplifier on and off, the necessity for a switch which effects 180° phase alternation of a subcarrier is avoided.

In accordance with the invention, a subcarrier having a frequency which is by $[(2n-1)/2]$ ($n$ being an integer) times the line frequency greater or lower than the colour subcarrier is used in order to derive a colour killer signal which controls the turning-on and -off of the bandpass amplifier of a colour killer circuit. Because this subcarrier has a different frequency from the colour subcarrier frequency, it will be referred to hereinafter as "offset subcarrier" for the purpose of distinction from the reference subcarrier used in the prior art. The offset subcarrier employed according to the invention contains a number of cycles per line period which is by $[(2n-1)/2]$ cycles more or less than the number of cycles of the colour subcarrier which are contained within the same time period. Consequently, assuming that the both subcarriers were in phase at the beginning of a certain line period, then it will be seen that the phase of the offset subcarrier will either lead or lag that of the normal colour subcarrier with time such that at the beginning of the next line period, it will have a phase difference of 180° with respect to the phase of the colour subcarrier. At the beginning of the next following line period, it will have undergone a phase difference of further 180° or a total of 360°. This permits the formation of a desired colour killer signal without relying on the phase alternation switch of the prior art in producing a reference subcarrier.

Figure 2:
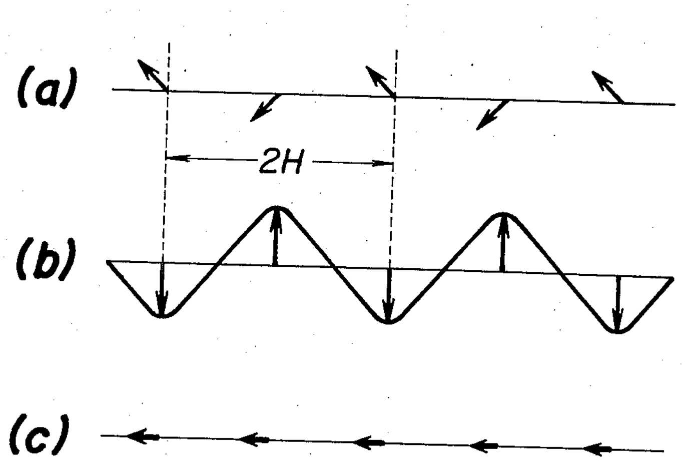
Figure 3:
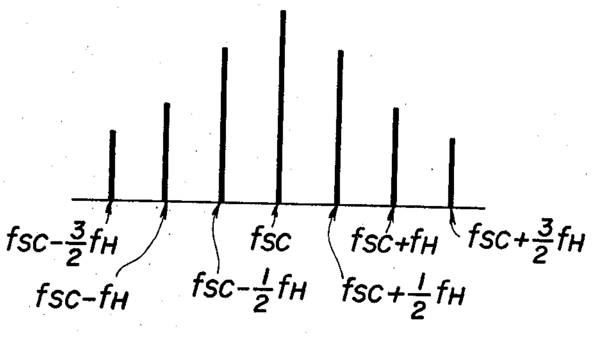
Figure 4:
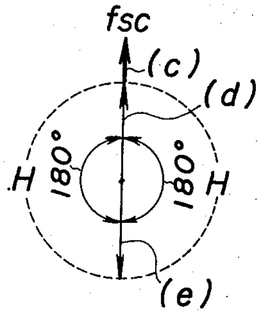
Figure 5:
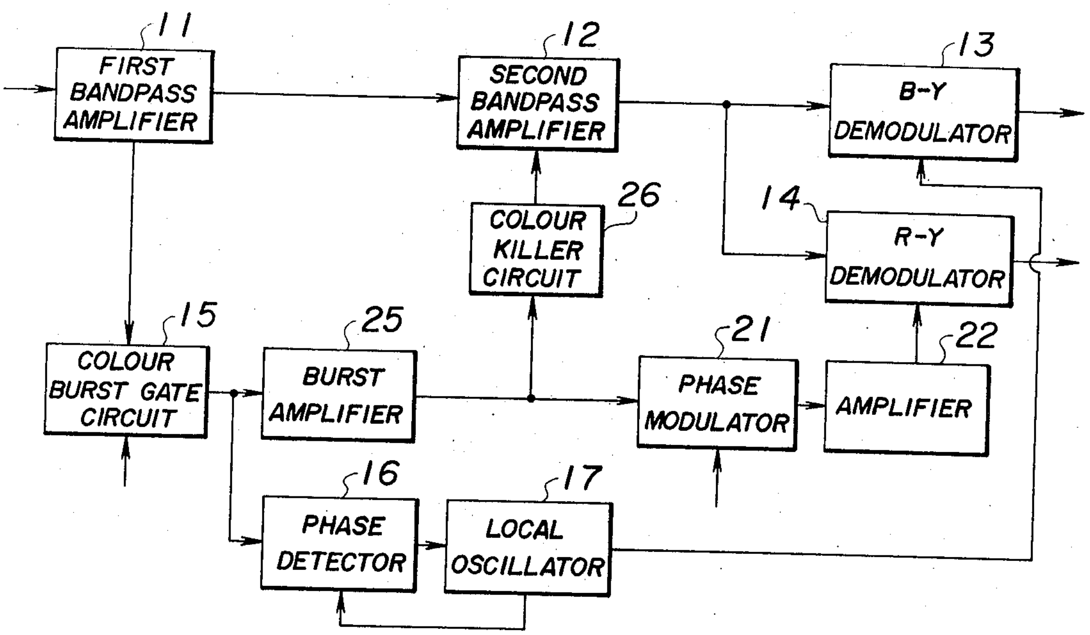
Figure 6:
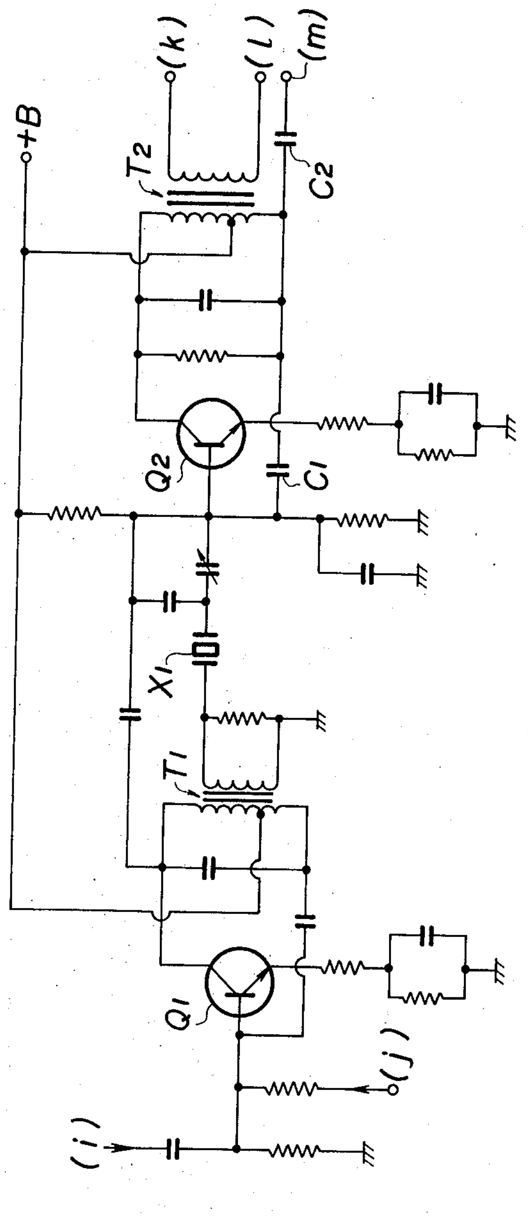

For a better understanding of the invention, the same will be described below in detail with reference to the attached drawings, in which:

FIG. 1 is a block diagram of the principal part of a colour television receiver incorporating the colour killer circuit according to the invention, FIGS. 2(*a*) and (*b*) are vector diagrams illustrating certain signal waves appearing in the system of FIG. 1, FIG. 2(*c*) is a vector diagram of colour burst contained in a colour television signal according to NTSC system, FIG. 3 shows a frequency spectrum of colour burst contained in a colour television signal according to PAL system, FIG. 4 is a schematic diagram illustrating the phase relationship between the colour subcarrier and the offset subcarrier, FIG. 5 is a block diagram of another embodiment of the invention, and FIG. 6 shows a specific example of a burst amplifier incorporating a crystal filter for use in the system shown in FIG. 5.

Referring to FIG. 1, there is shown in block form a colour signal circuit of a colour television receiver including a colour killer circuit which provides a phase detection of a colour burst and an offset subcarrier (as previously defined). A first bandpass amplifier 11 receives a chrominance signal and supplies it to a second bandpass amplifier 12 and a colour burst gate circuit 15. The second bandpass amplifier 12 adjusts the characteristic of the chrominance signal from the first amplifier 11 and supplies the adjusted chrominance signal to a B-Y demodulator 13 and an R-Y demodulator 14. The output from the gate circuit 15 is split into several paths, one of which is connected with a phase detector 18 which is in turn supplies from a local oscillator 19 having an oscillation frequency which, in accordance with the invention, is by $[(2n-1)/2]$ times the line frequency higher or lower than the frequency of the colour subcarrier. Thus, denoting the colour subcarrier frequency be fsc and the line frequency by $fH$, the local oscillator 19 produces an oscillation of an offset subcarrier frequency which is equal to $$fsc \pm [(2n-1)/2] fH.$$

Another portion of the output from the burst gate circuit 15 is fed to a colour killer circuit 20 which is also supplied with the offset subcarruer from the local oscillator 19, the circuit 20 substantially operating as a phase detector. As is conventional, the colour killer circuit 20 is connected with the second bandpass amplifier 12 for turning it on and off in accordance with the presence or absence of an output from the circuit 20. While the colour killer circuit is in itself well known and therefore is not specifically illustrated herein, the invention resides in supplying the offset subcarrier thereto. In this connection, some explanation of the offset subcarrier may be convenient, the output from the colour burst gate circuit 15 comprises a series of colour synchronizing signals having a repetitive period H, which is equal to the inverse of the horizontal scanning frequency. FIG. 2(*a*) shows the phases of successive burst signals, and it is seen that they repeat themselves with a period of 2H. Thus, referring to FIG. 3, these signals have a frequency spectrum which includes frequency components $$fsc + [(2n - 1)/2]\, fH$$

and $$fsc - [(2n - 1/2)]\, fH,$$

so that by choosing the oscillation frequency of the automatic phase control circuit (APC) constituted by the components 18 and 19 to be equal to said frequency, this APC circuit can readily be synchronized with one of the odd-numbered side-band waves. For the purpose of description hereinafter, the oscillation frequency of the oscillator 19 will be selected at $fsc + \frac{1}{2}fH$.

Considering the phase relation between the signal of the frequency $fsc + \frac{1}{2}fH$ and the colour subcarrier of the frequency fsc, it is readily apparent that the number of cycles of the former signal contained in an interval of 2H is just by one cycle greater than the number of cycles of the latter signal contained in the same interval. Picturizing this, the vector diagram of FIG. 4 illustrates that taking the signal of frequency fsc as a reference, the vector for the signal of frequency $fsc + \frac{1}{2}fH$ rotates in a counter-clockwise direction with time. Specifically, assuming that the both signals were in phase at the beginning of a certain line period, as shown by aligned vectors *c* and *d* in FIG. 4, the signal of the frequency $fsc + \frac{1}{2}fH$ gradually advances in phase with time to produce a phase difference of 180° with respect to the other signal at the beginning of the next line period, this being shown by a vector *e* in FIG. 4. At the beginning of the next following line period, the both signals will have a phase difference of 360° or become in phase with each other, thus indicating that the vector of the signal of frequency $fsc + \frac{1}{2}fH$ has undergone one revolution in a period of 2H or phase reversal of 180° for successive line periods.

In this manner, the invention avoids the need for a circuitry which functions as a switch to change over from one reference subcarrier to the other of opposite phase. It should be obvious that for an offset subcarrier having a frequency of $fsc - \frac{1}{2}fH$, the direction of rotation of the vector for the offset subcarrier would be reverse, and that for an offset frequency of $$fsc + [(2n - 1)/2]\, fH,$$

the vector would undergo the amount of rotation illustrated plus an integral number of revolutions. The consequence in either instance is that the offset subcarrier undergoes phase alternation of 180° at the beginning of successive line periods, as shown in FIG. 2(*b*).

In the embodiment of FIG. 1, the colour killer circuit 20 produces a detection voltage by phase detection of the colour burst and the offset subcarrier at a phase relationship as depicted in FIGS. 2(*a*) and (*b*), while it does not produce such a detection voltage when a colour burst is absent or when a colour burst received is of a different transmission system such as NTSC system as shown in FIG. 2(*c*). The detection voltage can be used to operate the second bandpass amplifier 12, thereby causing the colour signal circuit to operate normally only when a colour television signal according to PAL system is received.

Because an offset subcarrier is used according to the invention which is different from a reference subcarrier having a frequency equal to that of the colour subcarrier, it is necessary to provide a reference subcarrier that is adapted for demodulation of R-Y colour difference component. However, an arrangement therefor can be simplified by constructing from the offset subcarrier an effective reference subcarrier which can be used in the demodulation R-Y component. This constitutes the subject matter of the co-pending Patent Application No. 148,724 filed June 1, 1971 and allowed on Jan. 17, 1973. While this aspect of the receiver system does not constitute a part of the invention, it will be briefly described with reference to FIG. 1. Reference numeral 21 denotes a phase modulator which receives an offset subcarrier having a frequency of $$fsc + [(2n - 1)/2]\, fH$$

from the local oscillator 19 for phase modulation by a modulating wave indicated in the drawing by an arrow. The modulating wave is formed by a saw-tooth wave having a frequency equal to the line frequency. The effect of the phase modulation is that the phase difference between the offset subcarrier and the colour subcarrier is held constant at 0° or 180° alternately during each successive trace time, causing the phase of the offset subcarrier to vary by an amount of 180° stepwise between successive trace line. It will thus be seen that the output from the phase modulator 21 may be supplied through an amplifier 22 to the R-Y demodulator 14 to be used as a reference subcarrier effectively for demodulation of R-Y component.

FIG. 1 also shows a phase detector 16 which is supplied with a colour burst from the gate circuit 15 and which forms a conventional automatic phase control loop or colour synchronizing circuit together with another local oscillator 17 having an oscillation frequency which is equal to the colour subcarrier fsc. The output from the local oscillator 17 is fed to the B-Y demodulator 13.

FIG. 5 shows another embodiment of the invention in block form, like parts as in FIG. 1 being denoted by corresponding numerals. A colour killer circuit is shown at 26 and takes the form of an amplitude detector. This also receives an offset subcarrier having a frequency of $$fsc + [(2n - 1)/2]\, fH$$

as before, but is supplied with this subcarrier through a burst signal amplifier 25 including a high selectivity filter. The amplifier 25 filters the colour burst supplied from the gate circuit 15 and produces an output in the form of an offset subcarrier having a frequency of $$fsc \pm [(2n - 1)/2]\, fH$$

to the colour killer circuit 26. This output can only be obtained for a colour burst of the kind depicted in FIG. 2(*a*), and hence amplitude detection applied thereon by the colour killer circuit 26 produced a detection voltage, which can be used to control the operation of the second bandpass amplifier 12 as in the previous embodiment. Specific examples of the colour killer circuit which functions as an amplitude detector are also well known in the NTSC system, and it is pointed out that here again the invention is directed to supplying a colour killer circuit with an offset subcarrier.

FIG. 6 shows a specific circuit arrangement of a burst signal amplifier for the system of the type shown in FIG. 5. In this figure, a transistor $Q_1$ forms a gate circuit for burst signals, and a transistor $Q_2$ forms a subcarrier amplifier. A crystal filter $X_1$ has a resonance frequency of either $$fsc + [(2n- 1)/2]\, fH$$

or $$fsc - [(2n - 1)/2]\, fH.$$

The chrominance signal is applied to the circuit at a terminal *i*, while gate pilses having a period of H are applied at a terminal *j*, whereby a series of colour bursts are obtained at the collector of the transistor $Q_1$ are supplied to the crystal filter $X_1$ through a transformer $T_1$. As mentioned previously in connection with FIG. 3, the spectrum of the colour burst contains a plurality of sidebands of frequencies $$fsc + [(2n - 1)/2]\, fH$$

or $$fsc - [(2n - 1)/2]\, fH.$$

Because of the tuned nature and high Q-value of the crystal filter $X_1$, which affords a pass bandwidth to an extent of up to several hundred Hertz, only that one of the sidebands which has a frequency coincident with the frequency of the crystal filter is allowed to pass therethrough. Such a selected sideband is supplied, after filtering, to the transistor $Q_2$ for amplification, and is delivered as an offset subcarrier at output terminals *k* and *l*, the terminal *l* being connected to the ground. This output terminal *k* is connected with the secondary of a transformer $T_2$, and the primary thereof can be connected at its one end through a capacitor $C_2$ with a terminal *m* to provide an offset subcarrier output for the colour killer circuit 26 shown in FIG. 5.

The use of an offset subcarrier having a frequency of $$fsc \pm [(2n - 1)/2]\, fH$$

to operate a colour killer circuit has been described above. The offset subcarrier may be used either in phase detection configuration with a colour burst of specified nature or in an amplitude detection configuration. The former has been illustrated by the use of an automatic phase control circuit to provide synchronization of a local oscillator, while the latter has been illustrated by a burst signal amplifier including a crystal filter. However, in the former arrangement, the automatic phase control circuit may be replaced by an amplifier including a burst filter, a ringing oscillator, non-quartz controlled oscillator or any other similar circuit. This may be accomplished as by supplying an offset subcarrier to the colour killer circuit 20 shown in FIG. 1 from the terminal *k* of the circuit shown in FIG. 6. Also, the former arrangement may be realized by other similar circuit including a crystal filter. It will be obvious to those skilled in the art that in the circuit of FIG. 6, the neutralizing capacitor shown at $C_1$ may be removed and circuit parameters changed so as to form an oscillator around the transistor $Q_2$, thereby modifying the circuit into a ringing oscillator. Also it is apparent that the subcarrier having a frequency of $fsc \pm [(2n - 1)/2]\, fH$ and supplied to the colour killer circuit 20 of FIG. 1 may be derived from the output of the phase modulator 21. Therefore, it should be understood that the described embodiments are illustrative only, but in no way limitative of the invention, and it is intended that the scope of the invention be determined only by the appended claims.

What is claimed is:

1. A colour killer system in a colour television receiver for use with a signal transmission system such as a PAL system in which a pair of colour signals effect simultaneous quadrature balanced modulation of a colour subcarrier with respect to a pair of mutually perpendicular modulation axes, with one of the axes being reversed 180° for alternate horizontal scanning lines, said system comprising means providing a colour burst capable of providing distinction of the polarity of the colour subcarrier that is reversed, means for generating a subcarrier having an offset frequency of:

$$fsc \pm [(2n - 1)/2]\, fH$$

where *fsc* denotes the frequency of a colour subcarrier, fH the line frequency and n an integer greater than zero, said subcarrier being instrumental in deriving a colour killer signal, and means connected to said means for generating said subcarrier of said offset frequency and to said means providing said colour burst for providing said colour killer signal.

2. A system according to claim 1, in which said means providing said colour killer signal is a phase detector which phase detects the offset subcarrier and the colour burst.

3. A system according to claim 2, in which the means for generating the offset subcarrier is a local oscillator the output of which is synchronized with one of the sidebands of the colour burst.

4. A system according to claim 2, in which the mans for generating the offset subcarrier comprises an amplifier incorporating a crystal filter.

5. A system according to claim 2, in which the means for generating the offset subcarrier comprises a ringing oscillator incorporating a crystal filter.

6. A system according to claim 1, in which is included means for phase modulating the offset subcarrier by a saw-tooth wave having a frequency equal to the line frequency, said phase modulated wave being phase detected with said colour burst.

7. A system according to claim 1, in which said last-named means providing said colour killer signal amplitude detects the offest subcarrier wave.

8. A colour killer system according to claim 7 in which the means for generating said offset subcarrier comprises an amplifier incorporating a crystal filter.

* * * * *